(12) United States Patent
Chae et al.

(10) Patent No.: US 9,723,542 B2
(45) Date of Patent: Aug. 1, 2017

(54) METHOD AND APPARATUS FOR TRANSMITTING/RECEIVING DISCOVERY SIGNAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Hakseong Kim, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

(21) Appl. No.: 14/768,863

(22) PCT Filed: Mar. 17, 2014

(86) PCT No.: PCT/KR2014/002216
§ 371 (c)(1),
(2) Date: Aug. 19, 2015

(87) PCT Pub. No.: WO2014/142623
PCT Pub. Date: Sep. 18, 2014

(65) Prior Publication Data
US 2016/0007269 A1    Jan. 7, 2016

Related U.S. Application Data

(60) Provisional application No. 61/786,623, filed on Mar. 15, 2013, provisional application No. 61/873,827, (Continued)

(51) Int. Cl.
*H04W 48/08* (2009.01)
*H04L 5/00* (2006.01)
(Continued)

(52) U.S. Cl.
CPC .......... *H04W 48/08* (2013.01); *H04L 5/0016* (2013.01); *H04L 5/0048* (2013.01);
(Continued)

(58) Field of Classification Search
None
See application file for complete search history.

(56) References Cited

U.S. PATENT DOCUMENTS

2012/0002591 A1* 1/2012 Noh .................. H04B 7/15557
370/315
2012/0155310 A1* 6/2012 Kreuzer .............. H04W 52/146
370/252

(Continued)

FOREIGN PATENT DOCUMENTS

WO    2013/012222    1/2013

OTHER PUBLICATIONS

EADS, "Public safety usage and impacts on synchronization," 3GPP TSG-RAN WG1 #75, R1-135402, Nov. 2013, 6 pages.
(Continued)

*Primary Examiner* — Christopher Crutchfield
*Assistant Examiner* — Alan Lindenbaum
(74) *Attorney, Agent, or Firm* — Lee Hong Degerman Kang Waimey

(57) ABSTRACT

According to an embodiment of the present invention, a method for transmitting a discovery signal related to device to device (D2D) communication by a first UE in a wireless communication system comprises: mapping a codeword related to a discovery signal to two or more pairs of physical resource blocks (PRBs) on a time axis; and transmitting the mapped codeword, wherein a first pair of PRBs of the two or more pairs of PRBs includes a resource area for a first signal and whether an n-th (n>=2) pair of PRBs of the two or more pairs of PRBs includes the resource area for the first
(Continued)

signal is determined according to whether a next subframe of a subframe including an (n−1)-th pair of PRBs is for an uplink transmission.

13 Claims, 17 Drawing Sheets

Related U.S. Application Data filed on Sep. 4, 2013, provisional application No. 61/901,456, filed on Nov. 8, 2013, provisional application No. 61/907,398, filed on Nov. 22, 2013, provisional application No. 61/910,111, filed on Nov. 28, 2013, provisional application No. 61/930,963, filed on Jan. 24, 2014.

(51) Int. Cl.
*H04W 8/00* (2009.01)
*H04W 72/02* (2009.01)
*H04W 72/04* (2009.01)
*H04L 5/14* (2006.01)

(52) U.S. Cl.
CPC .......... *H04L 5/0082* (2013.01); *H04W 8/005* (2013.01); *H04W 72/02* (2013.01); *H04W 72/048* (2013.01); *H04L 5/0053* (2013.01); *H04L 5/14* (2013.01); *H04L 5/1469* (2013.01)

(56) References Cited

U.S. PATENT DOCUMENTS

| | | | |
|---|---|---|---|
| 2013/0064138 A1 | 3/2013 | Hakola et al. | |
| 2013/0142268 A1* | 6/2013 | Gao | H04W 76/023 375/252 |
| 2013/0315152 A1* | 11/2013 | Ratasuk | H04W 76/023 370/329 |
| 2015/0023267 A1* | 1/2015 | Lim | H04L 1/1854 370/329 |

OTHER PUBLICATIONS

LG Electronics, "D2D Communication Physical Channel Design," 3GPP TSG-RAN WG1 #75, R1-135480, Nov. 2013, 8 pages.
LG Electronics, "D2D Discovery Signal Format," 3GPP TSG-RAN WG1 #75, R1-135484, Nov. 2013, 6 pages.
LG Electronics, "Discussion on Synchronization for D2D Communications," 3GPP TSG-RAN WG1 #75, R1-135488, Nov. 2013, 7 pages.
European Patent Office Application Serial No. 14765151.7, Search Report dated Sep. 21, 2016, 10 pages.
PCT International Application No. PCT/KR2014/002216, Written Opinion of the International Searching Authority dated Jun. 25, 2014, 16 pages.
Nokia, et al., "On LTE D2D Methodologies and Metrics," 3GPP TSG RAN WG1 Meeting #72, R1-130501, Jan. 2013, 4 pages.
Fodor, et al., "Design aspects of network assisted device-to-device communications," In: IEEE Communications magazine, Mar. 2012, pp. 170-177.
Doppler, et al., "Advances in D2D Communications: Energy Efficient Service and Device Discovery Radio," In: Wireless Communication Vehicular Technology, Information theory and aerospace & electronics systems technology (Wireless VITAE), Feb. 2011, pp. 1-6.
PCT International Application No. PCT/KR2014/002216, Written Opinion of the International Searching Authority dated Jun. 25, 2014, 13 pages.

* cited by examiner

FIG. 5
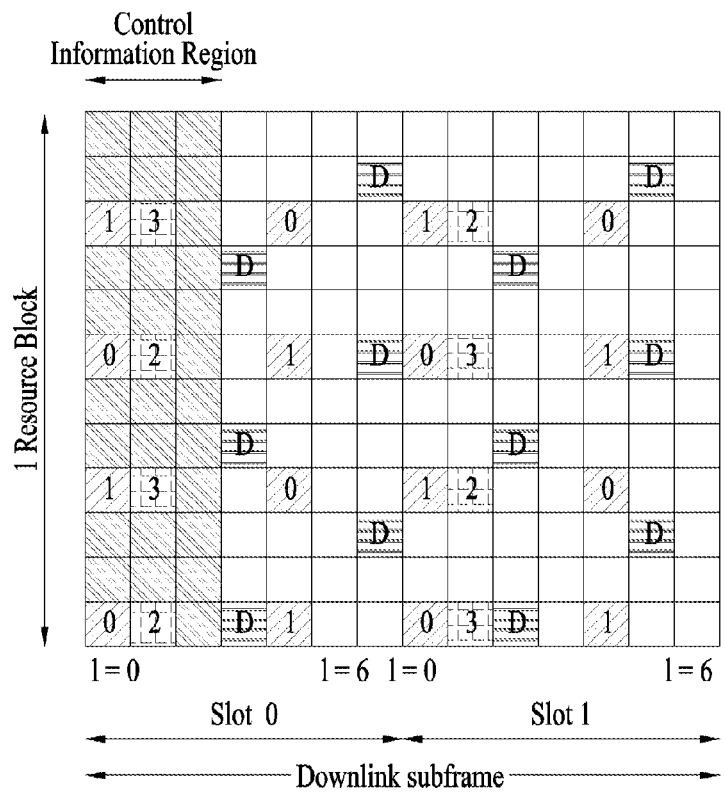
(a)
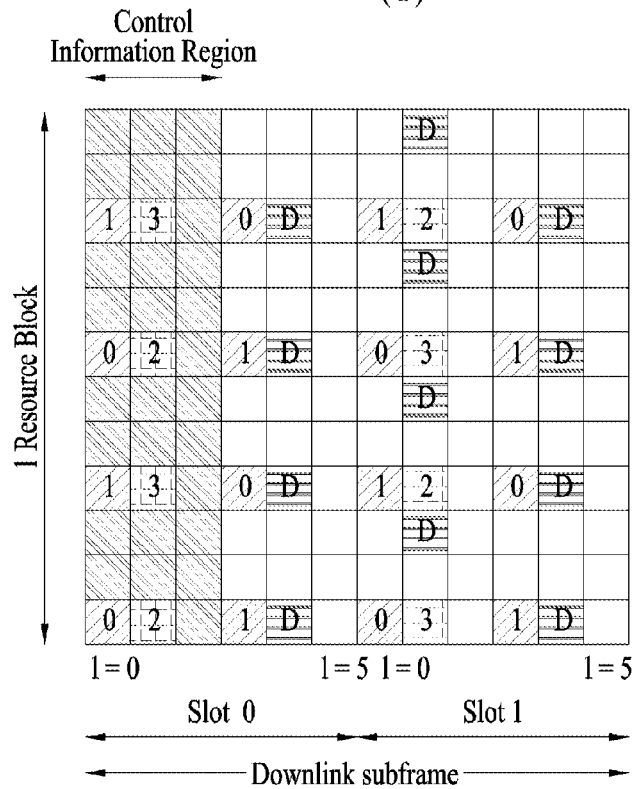
(b)

FIG. 6

| 11 | 23 | 35 |  | 47 | 59 | 71 | 11 | 23 | 35 |  | 47 | 59 | 71 |
|---|---|---|---|---|---|---|---|---|---|---|---|---|---|
| 10 | 22 | 34 |  | 46 | 58 | 70 | 10 | 22 | 34 |  | 46 | 58 | 70 |
| 9 | 21 | 33 |  | 45 | 57 | 69 | 9 | 21 | 33 |  | 45 | 57 | 69 |
| 8 | 20 | 32 |  | 44 | 56 | 68 | 8 | 20 | 32 |  | 44 | 56 | 68 |
| 7 | 19 | 31 |  | 43 | 55 | 67 | 7 | 19 | 31 |  | 43 | 55 | 67 |
| 0 | 18 | 30 |  | 42 | 54 | 66 | 0 | 18 | 30 |  | 42 | 54 | 66 |
| 5 | 17 | 29 |  | 41 | 53 | 65 | 5 | 17 | 29 |  | 41 | 53 | 65 |
| 4 | 16 | 28 |  | 40 | 52 | 64 | 3 | 16 | 28 |  | 40 | 52 | 64 |
| 3 | 15 | 27 |  | 39 | 51 | 63 | 2 | 15 | 27 |  | 39 | 51 | 63 |
| 2 | 14 | 26 |  | 38 | 50 | 62 | 2 | 14 | 26 |  | 38 | 50 | 62 |
| 1 | 13 | 25 |  | 37 | 49 | 61 | 1 | 13 | 25 |  | 37 | 49 | 61 |
| 0 | 12 | 24 |  | 36 | 48 | 60 | 0 | 12 | 24 |  | 36 | 48 | 60 |

DMRS ↑         DMRS ↑

(a)

| 11 | 22 | 33 |  | 44 | 51 | 66 | 11 | 22 | 33 |  | 44 | 51 | 66 |
|---|---|---|---|---|---|---|---|---|---|---|---|---|---|
| 10 | 21 | 32 |  | 43 | 50 | 65 | 10 | 21 | 32 |  | 43 | 50 | 65 |
| 9 | 20 | 31 |  | 42 | 49 | 64 | 9 | 20 | 31 |  | 42 | 49 | 64 |
| 8 | 19 | 30 |  | 41 | 48 | 63 | 8 | 19 | 30 |  | 41 | 48 | 63 |
| 7 | 18 | 29 |  | 40 | 59 | 62 | 7 | 18 | 29 |  | 40 | 59 | 62 |
| 0 | 17 | 28 |  | 39 | 58 | 61 | 0 | 17 | 28 |  | 39 | 58 | 61 |
| 5 | 16 | 27 |  | 38 | 57 | 60 | 5 | 16 | 27 |  | 38 | 57 | 60 |
| 4 | 15 | 26 |  | 37 | 56 | 71 | 4 | 15 | 26 |  | 37 | 56 | 71 |
| 3 | 14 | 25 |  | 36 | 55 | 70 | 3 | 14 | 25 |  | 36 | 55 | 70 |
| 2 | 13 | 24 |  | 47 | 54 | 69 | 2 | 13 | 24 |  | 47 | 54 | 69 |
| 1 | 12 | 35 |  | 46 | 53 | 68 | 1 | 12 | 35 |  | 46 | 53 | 68 |
| 0 | 23 | 34 |  | 45 | 52 | 67 | 0 | 23 | 34 |  | 45 | 52 | 67 |

DMRS ↑         DMRS ↑

(b)

FIG. 11
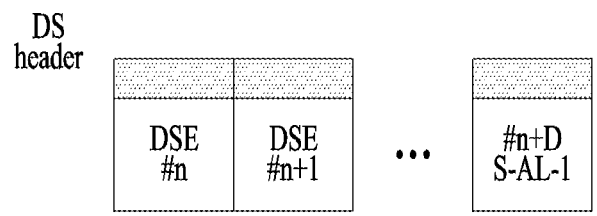
(a)
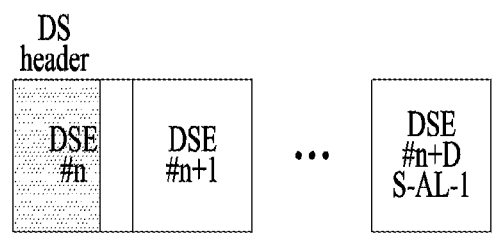
(b)
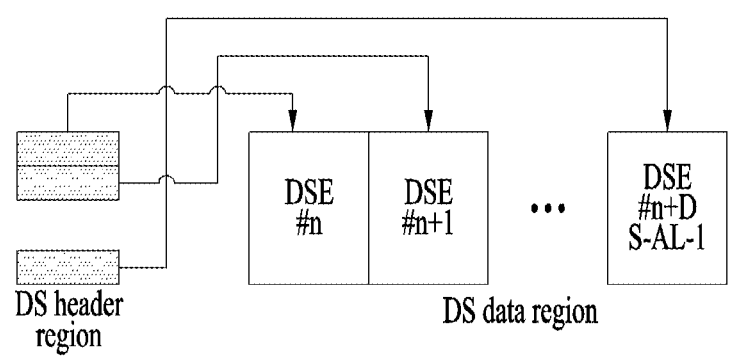
(c)

FIG. 12
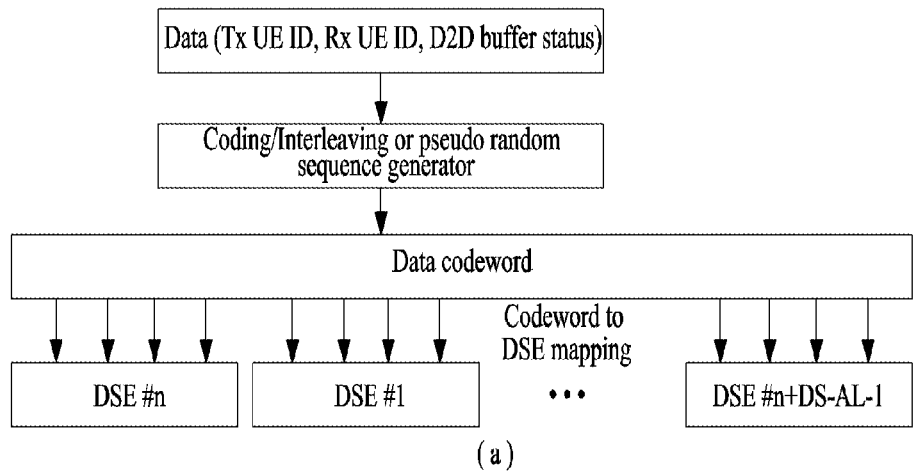
(a)
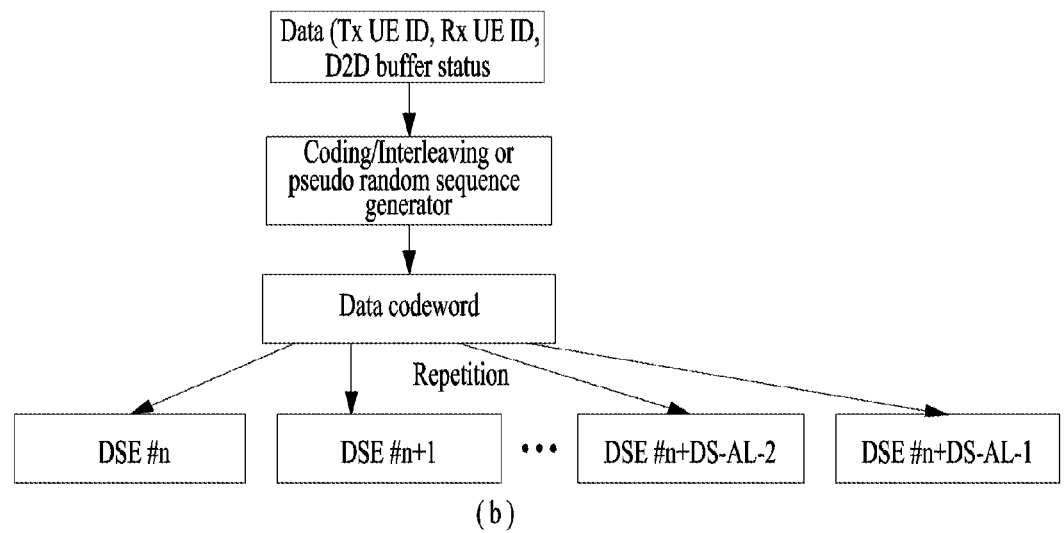
(b)
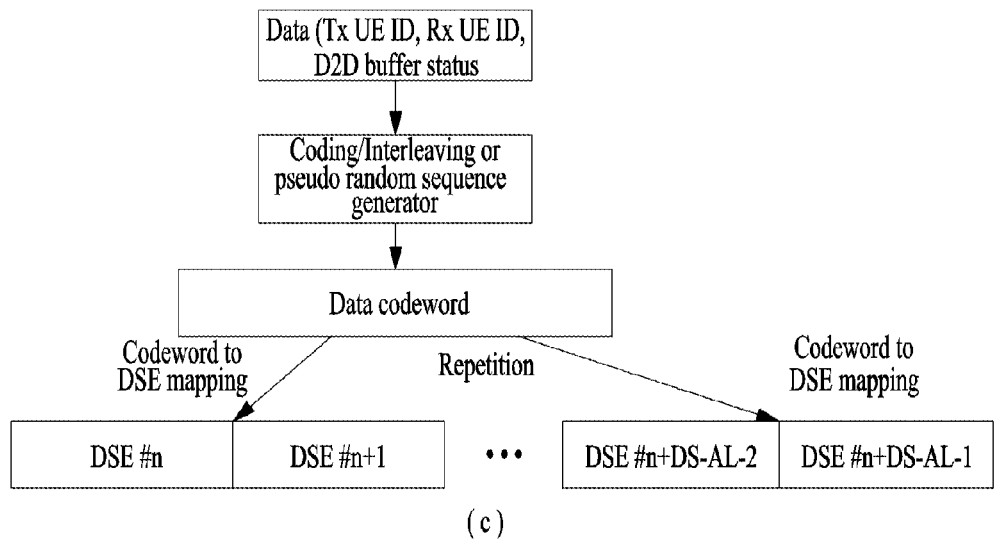
(c)

FIG. 17
(a) 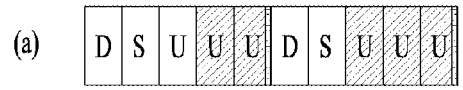
(b) 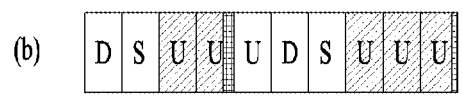
 : discovery subframe
FIG. 18
Table 4.2-2: Uplink-downlink configurations.
| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
FIG. 19
 : discovery subframe CS in 1st SF    Possible CS set in 2nd SF
                linked to CS in 1st SF

METHOD AND APPARATUS FOR TRANSMITTING/RECEIVING DISCOVERY SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2014/002216, filed on Mar. 17, 2014, which claims the benefit of U.S. Provisional Application Nos. 61/786,623, filed on Mar. 15, 2013, 61/873,827, filed on Sep. 4, 2013, 61/901,456, filed on Nov. 8, 2013, 61/907,398, filed on Nov. 22, 2013, 61/910,111, filed on Nov. 28, 2013 and 61/930,963, filed on Jan. 24, 2014, the contents of which are all hereby incorporated by reference herein in their entirety.

TECHNICAL FIELD

The present invention relates to a wireless communication system and, more specifically, to a method of transmitting and receiving a discovery signal related to device-to-device (D2D) communication.

BACKGROUND ART

A wireless communication system has been extensively developed to provide various types of communication services such as audio, data, etc. In general, the wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi-carrier frequency division multiple access (MC-FDMA) system, etc.

Device-to-device (D2D) communication refers to a communication scheme in which audio, data, etc. are directly exchanged between user equipments (UEs) without passing through a base station (evolved NodeB (eNB)) by configuring a direct link between the UEs. D2D communication may include a scheme such as UE-to-UE communication, peer-to-peer communication, etc. In addition, the D2D communication scheme may be applied to machine-to-machine (M2M) communication, machine type communication (MTC), etc.

D2D communication is considered as a scheme capable of relieving a burden on a base station resulting from rapidly increasing data traffic. For example, according to D2D communication, network overload may be reduced since data is exchanged between devices without passing through a base station unlike a conventional wireless communication system. In addition, when D2D communication is introduced, it is possible to achieve effects such as a reduction in procedures of a base station, a reduction in power consumption of devices participating in D2D communication, an increase in data transfer rate, an increase in network capacity, load balancing, extension of cell coverage, etc.

DISCLOSURE

Technical Problem

An object of the present invention devised to solve the problem lies in a configuration of a discovery signal for efficiently transmitting the discovery signal in D2D communication.

Technical problems to be solved by the present invention are not limited to the above-mentioned technical problems, and other technical problems not mentioned herein may be clearly understood by those skilled in the art from description below.

Technical Solution

A first technical aspect of the present invention is a method of transmitting a discovery signal related to device-to-device (D2D) communication by a first user equipment (UE) in a wireless communication system, the method including mapping a codeword related to the discovery signal to at least two pairs of physical resource blocks (PRBs) on a time axis, and transmitting the mapped codeword, wherein a first PRB pair among the at least two PRB pairs includes a resource region for a first signal, and whether the resource region for the first signal is included in an n-th PRB pair (n>=2) among the at least two PRB pairs is determined based on whether a subframe subsequent to a subframe including an (n−1)th PRB pair is for uplink transmission.

A second technical aspect of the present invention is a first UE transmitting a discovery signal related to D2D communication in a wireless communication system, including a reception module, and a processor, wherein the processor maps a codeword related to the discovery signal to at least two PRB pairs on a time axis, and transmits the mapped codeword, a first PRB pair among the at least two PRB pairs includes a resource region for a first signal, and whether the resource region for the first signal is included in an n-th PRB pair (n>=2) among the at least two PRB pairs is determined based on whether a subframe subsequent to a subframe including an (n−1)th PRB pair is for uplink transmission.

The first and second technical aspects of the present invention may include the following details.

The n-th PRB pair may include the resource region for the first signal when the subframe subsequent to the subframe including the (n−1)th PRB pair is for downlink transmission.

A subframe including a last PRB pair may include a guard period.

A length of the guard period may be related to a maximum timing advance in a cell including the first UE when a subframe subsequent to the subframe including the last PRB pair among the at least two PRB pairs is for uplink transmission.

A length of the guard period may be related to a time necessary for transmission-reception switching when a subframe subsequent to the subframe including the last PRB pair among the at least two PRB pairs is for downlink transmission.

A length of the guard period may be 0 when an offset of −20 us is applied to transmission of the discovery signal.

Subframes including the at least two PRB pairs, respectively, may correspond to continuous uplink subframes.

A last subframe of the subframes including the at least two PRB pairs, respectively, may be a last subframe of the continuous uplink subframes.

A length of the guard period may be related to a time necessary for transmission-reception switching.

The mapping of the codeword may be performed using a time-first scheme in an ascending order of subcarrier indices in the at least two PRB pairs.

Each of the pairs of PRBs may correspond to a discovery signal element, and the number of the at least two PRB pairs corresponds to a discovery signal aggregation level.

The discovery signal aggregation level may be indicated by a header included in the discovery signal element.

The discovery signal aggregation level may be greater than or equal to a predetermined value when the UE is related to public safety.

The first signal may be used for automatic gain control (AGC) of a second UE receiving the discovery signal.

Advantageous Effects

According to the present invention, it is possible to enhance resource use efficiency since a discovery signal may be adaptively configured in a channel environment. Effects that may be obtained from the present invention are not limited to the above-mentioned effects, and other effects not mentioned herein may be clearly understood by those skilled in the art from description below.

DESCRIPTION OF DRAWINGS

The accompanying drawings in the present specification are intended to provide better understanding of the present invention, illustrate various embodiments of the present invention, and describe a principle of the present invention together with a description in the specification.

FIG. 5 is a diagram for description of a reference signal.

FIGS. 6 and 7 are diagrams for description of a discovery signal element according to an embodiment of the present invention.

FIGS. 8 to 12 are diagrams for description of a discovery signal according to an embodiment of the present invention.

FIGS. 15 to 20 are diagrams for description of a configuration of a discovery signal according to an embodiment of the present invention.

BEST MODE

Figure 1:
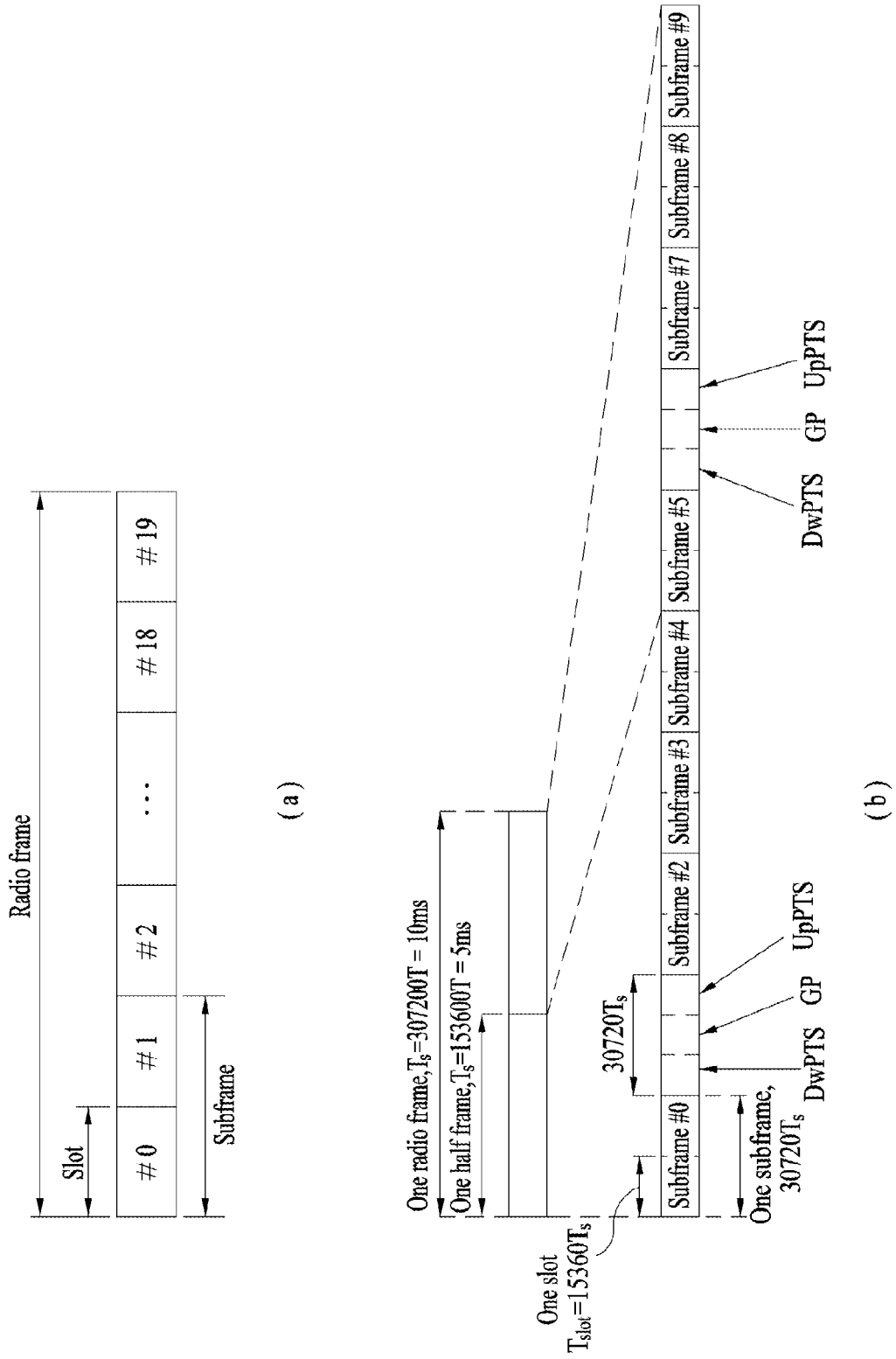
FIG. 1 is a diagram illustrating a configuration of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Configuration/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
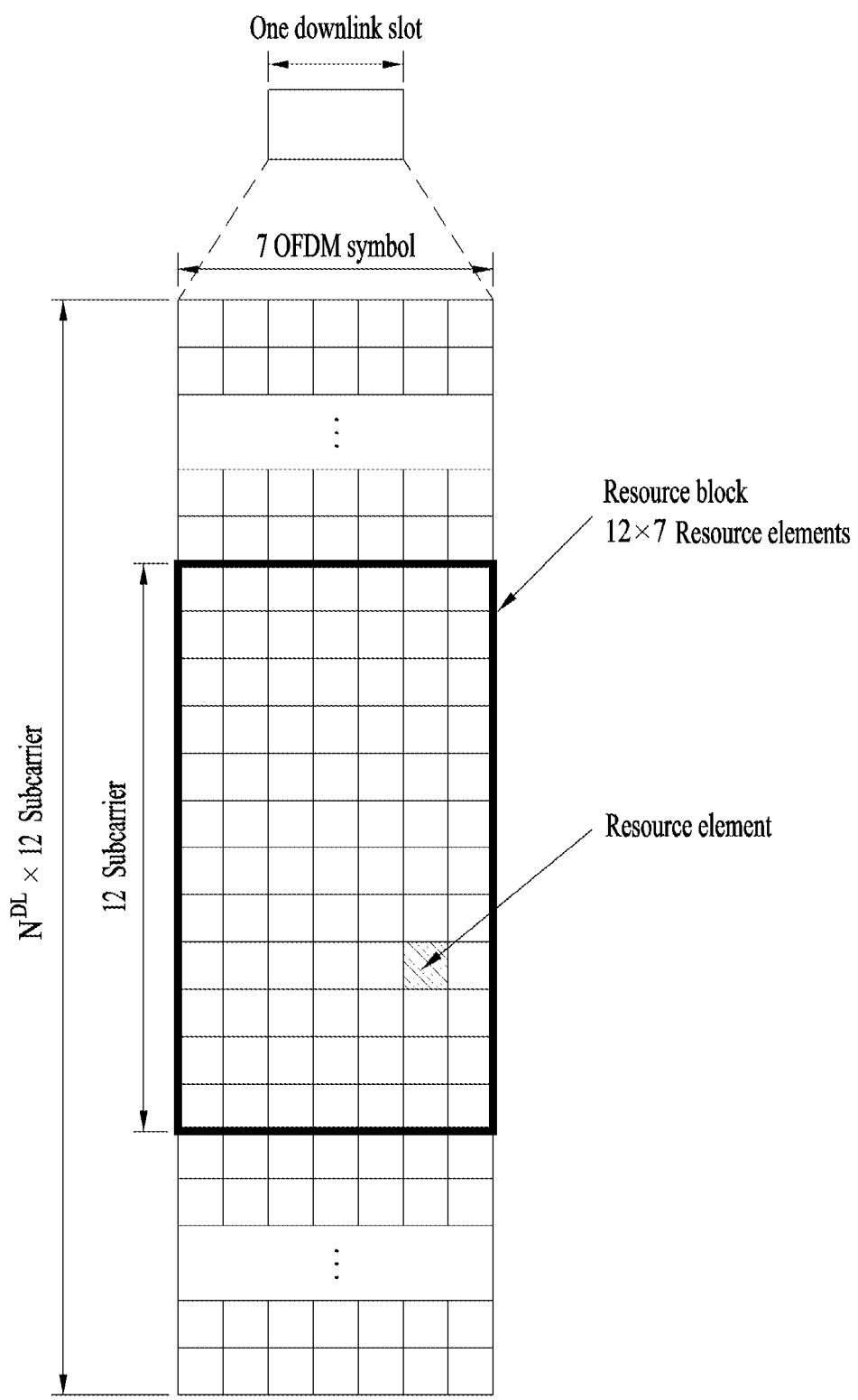
FIG. 2 is a diagram illustrating a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, $N^{DL}$ depends on a downlink transmission bandwidth. An uplink slot may have the same structure as a downlink slot.

Figure 3:
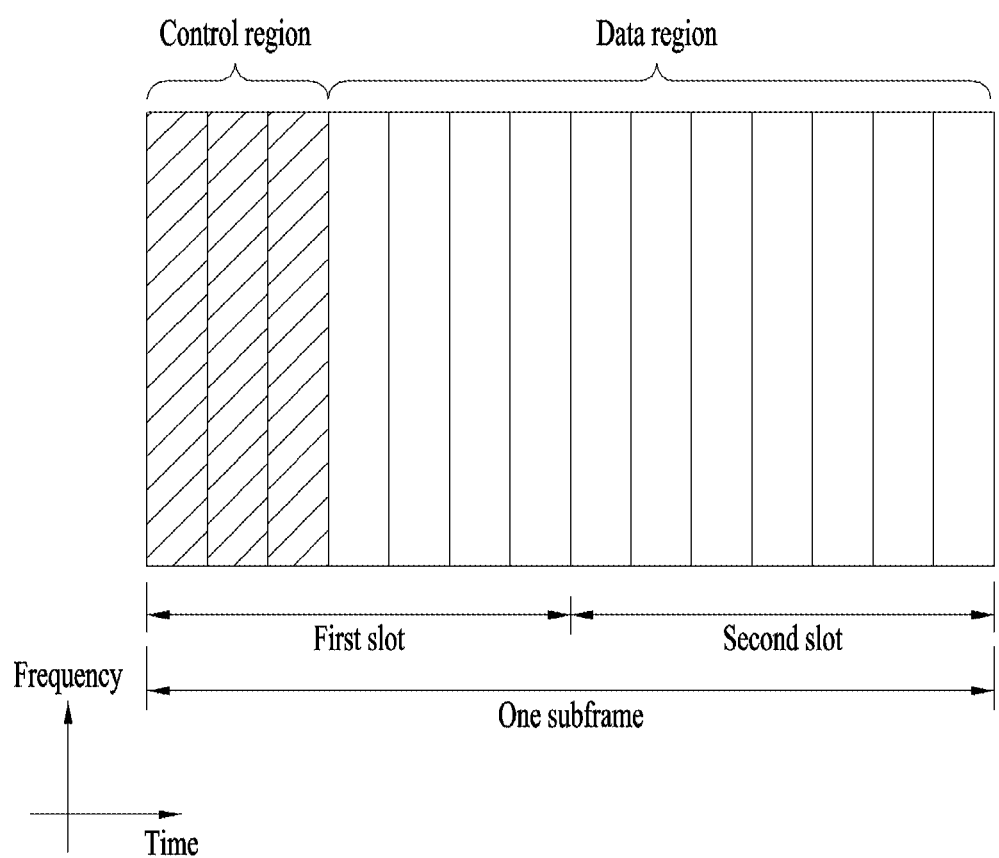
FIG. 3 is a diagram illustrating a configuration of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
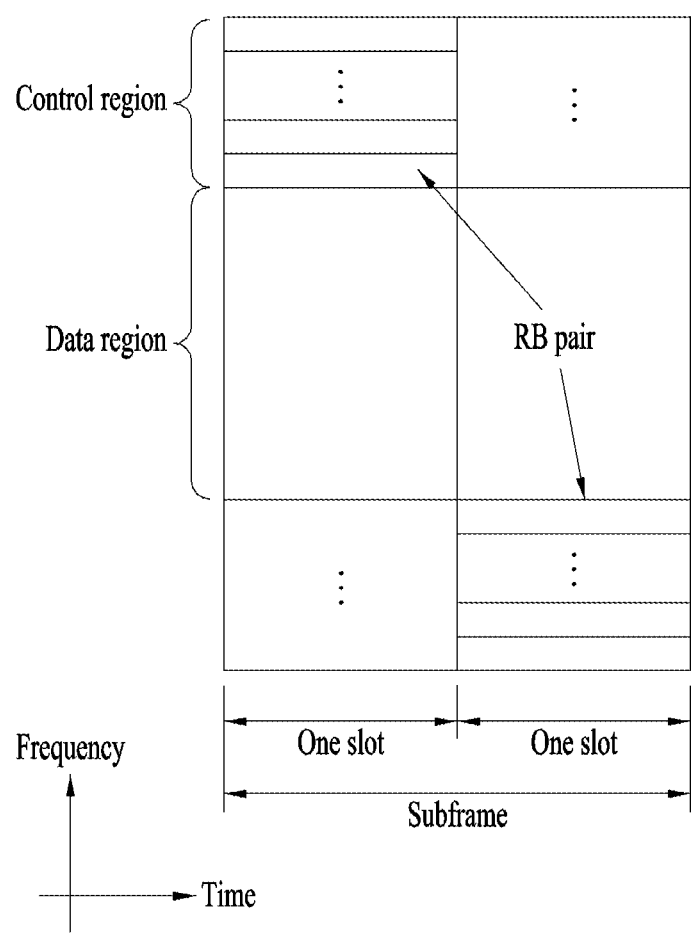
FIG. 4 is a diagram illustrating a configuration of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(a)) and 12 OFDM symbols in time in the case of the extended CP (see FIG. 5(b)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

Hereinafter, a description will be given of D2D communication according to an embodiment of the present invention, particularly, transmission and reception of a discovery signal based on the above description. In D2D communication, the discovery signal refers to a signal used to search for a UE on the other side. It is preferable that the discovery signal be used to search for a great number of UEs at high reliability using as few resources as possible. When a discovery signal having a fixed length/size is used irrespective of a channel environment, a length/size of the discovery signal needs to be defined based on a worst case, which is disadvantageous in terms of resource management.

Discovery Signal Element (DSE)

A discovery signal according to an embodiment of the present invention may include an aggregation of discovery signal elements. In other words, a basic unit for transmission of a discovery signal is a DSE, and the number of DSEs included in one discovery signal (DS) may be referred to as a DS aggregation level (DS-AL). Here, the DSE is a set of a predetermined number of REs, and may include an RE independent of a reference signal or used for the reference signal. An RE included in one DSE may be concentrated in a particular time-frequency domain (regional DSE) or dispersed in a time-frequency domain (dispersive DSE). For example, one physical resource block (PRB) pair may be included in one DSE, or one RE set obtained when a PRB pair is divided into N pieces may be configured as a DSE.

The DSE will be examined in further detail. The DSE may be differently configured depending on whether a transmission/reception scheme is an OFDM scheme or an SC-FDM scheme, which will be described hereinafter.

First, in the OFDM scheme, conventional schemes in the LTE/LTE-A system may be used as a resource allocation scheme and an RS mapping scheme. For example, when one PRB pair is configured as N DSEs, one DSE may be generated using the following scheme. REs in the PRB pair are numbered using a frequency-first scheme. When a remainder obtained by dividing the REs by N is i, the REs belong to DSE i. Here, when REs are numbered, an RE for another signal such as an RS may be excluded or included. In an RS for a DSE, when one PRB pair includes four DSEs, four DMRS ports may be allocated to each DSE. In this instance, a cell ID, an ID of a DS transmission UE, an ID of a reception UE, a particular service ID, a virtual ID, etc. may be used for generation of the RS. When an RS sequence is determined using a different ID for each UE, orthogonality may be a problem in the same CDM group in a DMRS. To solve this problem, i) CDM may not be applied in a CDM group, or ii) UEs using the same CDM group may be configured to use the same RS sequence (when a UE determines an RS CDM group, an RS sequence ID allocated in advance may be used). Alternatively, iii) independent port numbers may be applied to difference REs in a CDM group without applying CDM.

Next, in the SC-FDM scheme, an interleaved SC-FDMA (IFDMA) scheme or a localized SC-FDMA scheme may be used when a DSE is configured. In the IFDMA scheme, REs are numbered in frequency order, and REs, a remainder of which obtained by dividing the REs by the number of DSEs is i, are determined to be REs belonging to DSE i. In SC-FDMA, an RS is transmitted on a separate SC-FDM symbol. Thus, in a symbol in which no RS is transmitted, all REs may be used for a configuration of a DSE. In this instance, cyclic shift (numbered REs are cyclic-shifted for each SC-FDM symbol) may be applied in several SC-FDM symbols. FIG. 6(a) illustrates a case in which one PRB pair includes four DSEs and CS is not applied, and FIG. 6(b) illustrates a case in which one PRB pair includes four DSEs and CS is applied. A DMRS is used as an RS, and a DMRS sequence may correspond to one of a DS transmission UE ID, a DS reception UE ID, a particular service ID, an ID used by a UE group (for example, the UE group may be a group of particular UEs or UEs receiving a synchronization signal transmitted by a base station), and a virtual ID. (An RS sequence group may be determined using a particular field of an ID, and CS of an RS sequence may be determined using another field.)

Figure 7:
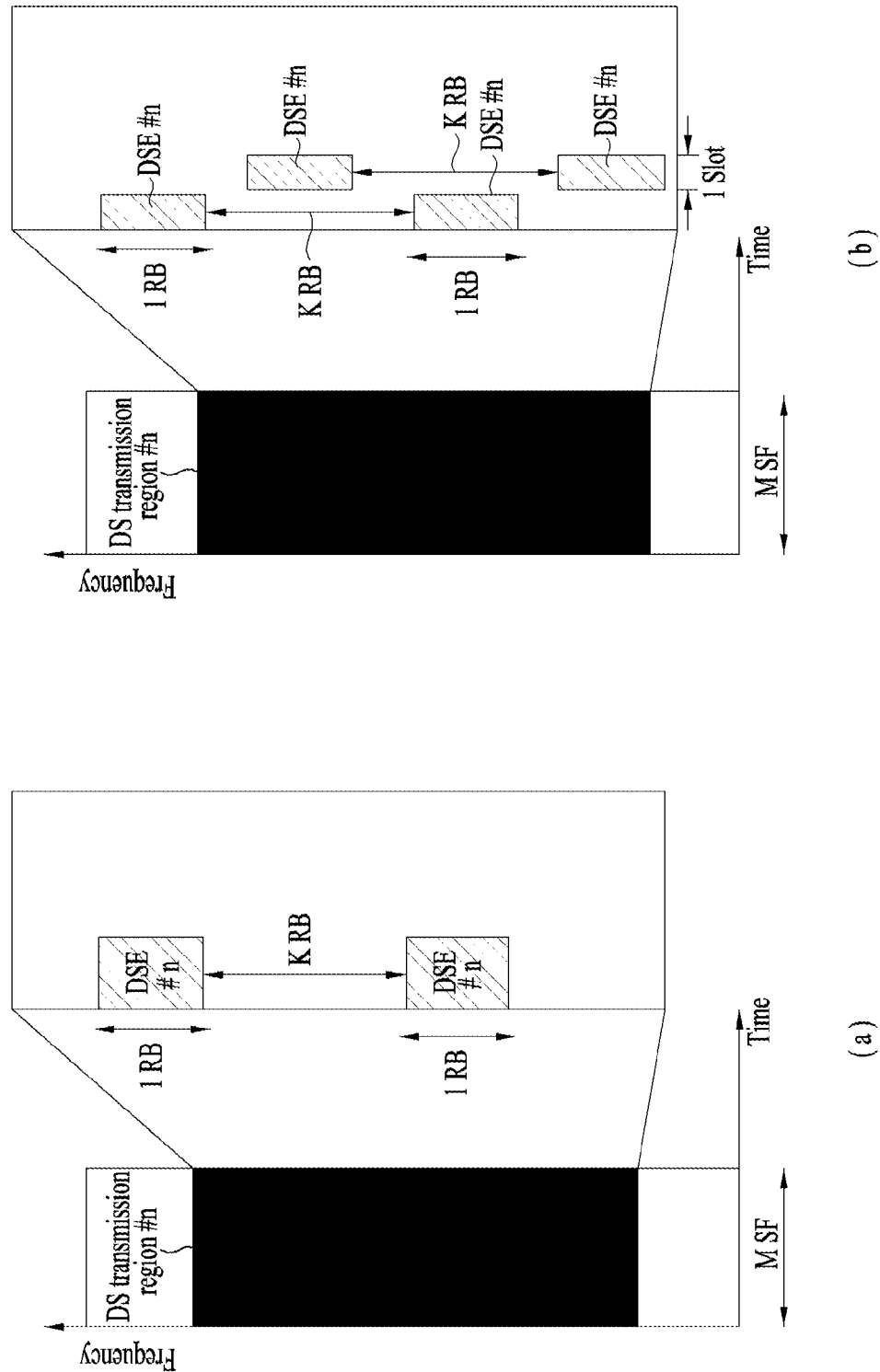

A DSE may include a plurality of RB combinations. When the number of information bits necessary for a DS corresponds to one RB, and a sufficient code rate is not supported, two or more RBs may be included in the DSE. In this case, the RBs included in the DSE may be separated from each other by K RBs on the frequency axis as illustrated in FIG. 7(a), or slot hopping may be additionally applied as illustrated in FIG. 7(b).

DSE/DS Transmission Region

A region in which a DS can be transmitted may be signaled in advance by a base station/particular UE. In other words, a PRB pair index in which a DS can be transmitted and an index corresponding to a predefined resource unit (for example, N RB units, etc.) may be signaled.

Here, the amount of resources with which a DS can be transmitted (for example, the number of PRB pairs) may vary according to service. For example, when a minimum DS-AL is related to great public safety, a great number of PRB pairs may be allocated to a particular UE or UE group.

Alternatively, the amount of resources with which a DS can be transmitted may vary according to a type of a DSE. For example, in the dispersive DSE, a greater number of PRB pairs may be allocated when compared to the regional DSE. A type of a DSE, a DS-AL, and a size of a PRB pair occupied by one DS may vary according to the amount of resources (or bandwidth) with which a DS can be transmitted. For example, one DS may be set to 1 RB when SORB is used as a resource for transmission of a DS, and set to 2 RB when the resource for transmission of the DS exceeds SORB. As a result, the number of blind decodes of the DS per DE resource region may be restricted to below a certain level.

A region in which a DS can be transmitted may correspond to one or more OFDM symbols (or SC-FDM symbols)—a whole frequency band.

Figure 8:
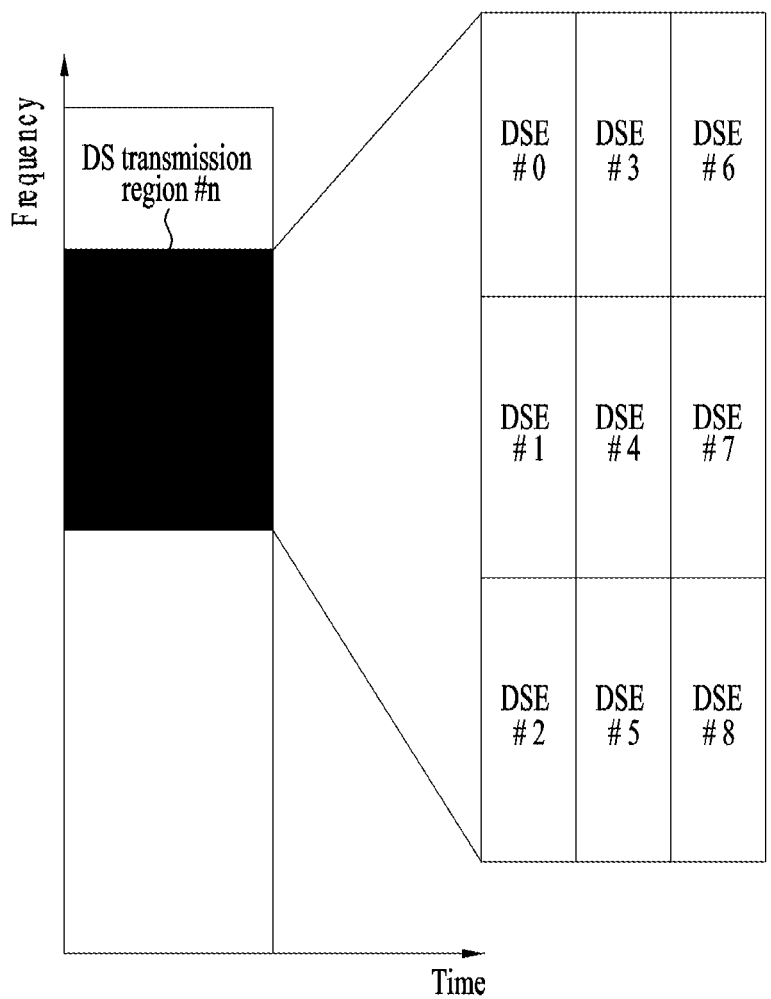

One DS may include a combination of a dispersive DSE and a regional DSE. For example, a DS of DS-AL 4 may include two dispersive DSEs and two regional DSEs. Here, in the SC-FDM scheme, a regional DSE may be an adjacent frequency resource. A dispersive DES may have the same form as that of IFDMA. In this case, a repetition factor (RPF) may be a value determined based on the number of DSEs in a DS region, set by the base station (a physical layer signal or an upper layer signal), or determined in advance. In addition, a UE outside a cell coverage area may use a predetermined value. A DS may correspond to a predetermined resource region for the UE outside the cell coverage area. For example, as illustrated in FIG. 8, a DS may be transmitted only on three symbols of a subframe or an n-th subframe of a radio frame.

Alternatively, the dispersive DSE may include a combination of dispersed RBs in a frequency domain unlike IFDMA. In IFDMA, resources are allocated by being separated by subcarriers since performance may be seriously degraded when in-band emission is severe.

A DS transmission region may be configured based on the amount of interference around a D2D UE. For example, only a resource region in which the amount of interference is less than or equal to a particular threshold value may be regarded as the DS transmission region. The DS transmission region may be determined by a D2D reception UE. When a distance between D2D UEs is short, a transmission UE and a reception UE may be in a similar interference condition. Thus, a D2D transmission UE may determine the DS transmission region. Alternatively, the base station may determine the DS transmission region based on CQI, RSSI, RSRP, RSRQ, etc. reported by UEs and inform the UEs of the determined DS transmission region.

The DS transmission region may be determined based on a DS-AL of the DS transmission region. For example, a service having a high DS-AL (public safety, etc.) may allocate a lot of resource regions as DS regions even when an interference level is high. The base station may configure a subframe period of the DS transmission region, a time offset, and a (time/frequency) RB index of a transmission region (or an RB start position/number when SC-FDM is used) using a physical layer signal (SIB or (E)PDCCH) or an upper layer signal (RRC and MAC signaling) for a UE/UE group.

The DS transmission region may be determined based on the number of UEs transmitting DSs. More specifically, the base station may allocate a wide DS transmission region when an average number of UEs in a corresponding region is large, and allocate a small DS transmission region when the number of UEs is small.

DS

As mentioned above, a DS may include DSEs, the number of which corresponds to a DS-AL. The DS may include a header and data.

Figure 9:
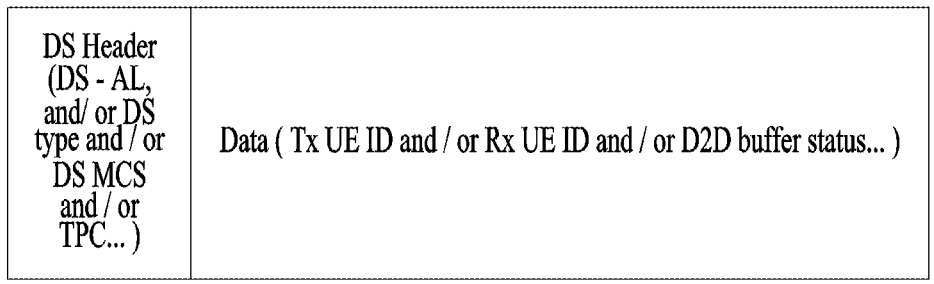

Referring to FIG. 9, a header portion of the DS may include at least one of a DS-AL, a DS type, an MCS of the DS, a TPC of the DS, a service type, DMRS sequence information of a data region, information related to cyclic shift of a DMRS, information about whether an orthogonal cover code (OCC) is applied to the DMRS, etc. In addition, a data portion of the DS may include at least one of a transmission UE ID, a reception UE ID, a D2D buffer state, presence/absence of data, information about a network connection state, information about whether a D2D UE on the other side receives the DS, etc. However, FIG. 9 is merely an example. The information included in the data portion as illustrated in FIG. 9 may be included in the header portion, and vice versa. The header portion may be decoded independently of the data region.

Figure 10:
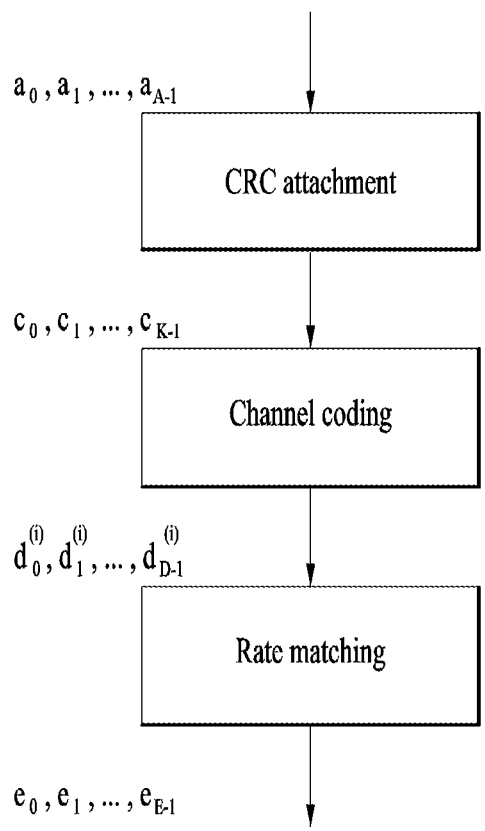

FIG. 10 illustrates a method of generating the header and the data of the DS. CRC added to the header or the data may be scrambled in a DS transmission UE ID, a DS reception UE ID, a transmission/reception UE ID, a particular D2D service, and another group ID. When the DS is for all UEs, CRC may not be scrambled. A header region and a data region may be scrambled using different schemes. For example, CRC of a header portion may not be transmission-masked/scrambled, or be masked by a service ID, and a data portion may be masked by a transmission UE ID. CRC of the data region may be scrambled in an ID of a synchronization source UE or a cluster header. The above-described schemes of masking CRC may be used to scramble data of the data region or the header region. For example, the data of the data region or the header region may be scrambled in a sequence generated by the ID of the synchronization source UE. A codeword transmitted in the header or data region of the DS may be replaced by a pseudo random sequence generated using information transmitted in the header or data region of the DS as a seed value of the pseudo random sequence. For example, a particular sequence may be transmitted prior to transmission of a DSE, and then a DSE in a codeword may be transmitted.

As illustrated in FIG. 11, the DS header may be present in all DSEs (the same header information) (FIG. 11(a)), present only in a first DSE (FIG. 11(b)), or present in a region separated from the DSEs (FIG. 11(c)). In the case of FIG. 11(a), it is advantageous in that a UE may receive header information even when the UE may not decode some DSEs.

DS data may be generated as in each case illustrated in FIG. 12. Specifically, referring to FIG. 12(a), a codeword may be generated through channel coding of a UE ID. Here, a code rate may correspond to an information bit length of an ID/(the number of REs available to a DS-AL (the number of REs excluding REs to be used by an RS and a DSE header)*a modulation order). In this scheme, it can be understood that respective DSEs in one coding chain transmit different redundancy versions. In this instance, an AL (=the number of retransmissions) and an order of RV may be determined in advance, adaptively determined by a transmitter, or indicated by a cluster head (synchronization head). Referring to FIG. 12(b), one DS may be channel-coded by the number of REs available to one DSE (excluding REs to be used by an RS and a DSE header)*a modulation order to generate a codeword, and one DSE may be repeated a number of times corresponding to a DS-AL. In this case, among several DSEs, a DSE receiving severe interference may be excluded or MRC-combined. Referring to FIG. 12(c), N DSEs may be subjected to single channel coding to generate a codeword, which may be repeated a number of times corresponding to DS-AL/N, thereby configuring one DS. Here, N may be a value which is preset or determined in connection with a DS-AL. For example, a value of N may increase in proportion to a value designated by a base station or a UE, or a DS-AL.

Setting of DS-AL

A DS-AL may be determined as below. The DS-AL may be a value indicated by a base station with respect to a UE/UE group.

The DS-AL may be determined based on a distance from the base station. For example, a UE or a UE group having high RSRP (and/or RSRQ) from the base station may be allowed to use a high DS-AL. A value of DS-AL according to a RSRP threshold value and RSRP may be signaled to the UE through a physical layer (SIB or (E)PDCCH) or an upper layer signal (RRC, MAC signaling). Alternatively, the DS-AL may differ between services. For example, a high value (for example, 8 or more) may be used as a DS-AL of a DS for advertisement. In addition, when an advertiser pays a high fee for an advertisement, a high DS-AL may be used to ensure wide coverage. As another example, a DS-AL may be set to a high value for a public safety service.

The base station may designate a range of an available DS-AL for a particular UE/UE group. Alternatively, the base station may directly indicate a combination of DS-ALs available to the particular UE/UE group. Information about a value or a range of a DS-AL, or a combination of DS-ALs may be signaled by the base station in advance or autonomously determined by the UE/UE group. For example, the UE may measure the amount of interference (RSSI or subband CQI) around the UE, and determine a DS-AL to be 4 or more when the RSSI exceeds a particular threshold value. This case may be useful for a UE out of cell coverage. The base station may request that the UE report some or all of a CQI, an RSSI, RSRP, and RSRQ in order to set a DS-AL. The base station may determine a DS-AL or a range of the DS-AL based on reported information, and inform UEs of the determined DS-AL or range thereof.

Alternatively, a UE having a particular function may indicate a DS-AL value, a range of a DS-AL, a combination of DS-AL, etc. For example, in the public safety service, a UE used by a master (which may be a master UE having a particular function) or a UE that representatively transmits a synchronization signal may instruct neighbor UEs to use a particular value as a DS-AL on the outside of coverage.

A particular portion of a DSE (for example, a header) may include bits indicating a DS-AL. For example, some bits may be regarded as the bits indicating the DS-AL based on a starting point at which the DSE is transmitted from an ID of a particular UE desired to be discovered by a particular UE. A UE may first decode a particular region of each DSE, and then attempt to decode a DS based on an AL.

The UE may detect a transmission position of a DS through hashing from a UE ID. In this instance, the position may be hashed using both IDs of transmission/reception UEs. As an example, the position may be hashed from the ID of the transmission UE to generate a sequence X (10), and the position may be hashed from the ID of the reception UE to generate an additional bit sequence (11), and then a new bit sequence [X, Y] (for example, [1011]=11th DSE) may be determined to be a starting point of DS transmission used by the transmission UE. As another example, when the reception UE does not accurately know the ID of the transmission UE, X may be decoded from a possible combination based on a bit sequence such as [x, 10]. Alternatively, the DS transmission position may be obtained from one of the ID of the transmission UE and the ID of the reception UE. For example, a bit sequence may be hashed using only the ID of the transmission UE, and then a DS of a corresponding position may be received. Meanwhile, a DS transmission position may be differently set according to service type. For example, only use related to public safety may be made possible after an N-th DSE index of a DS transmission region.

Figure 13:
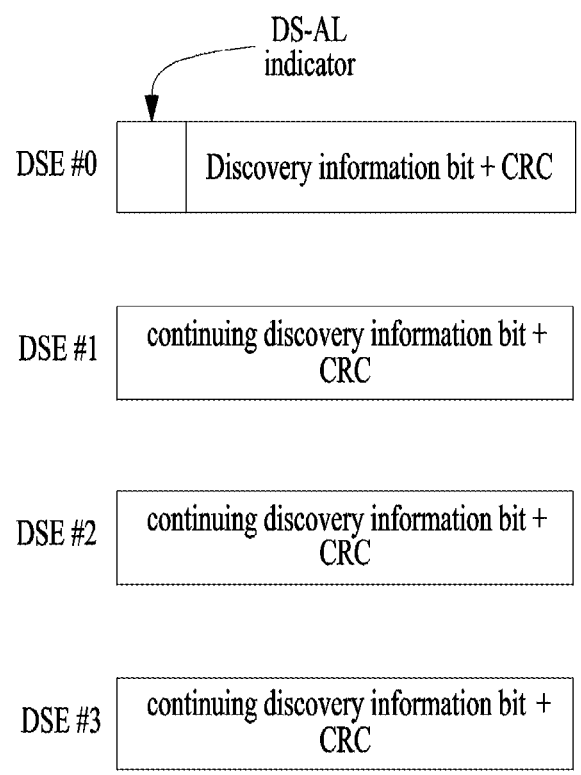
FIGS. 13 and 14 are diagrams for description of a discovery signal aggregation level according to an embodiment of the present invention.

A DSE included in a DS may include information indicating a DS-AL (DS-AL indicator), and a UE may detect the DS-AL and then perform additional decoding by regarding DSEs corresponding to the DS-AL as one DS. For example, as illustrated in FIG. 13, in a case of DS-AL 4, among four DSEs, a first DSE may include information indicating a DS-AL (DS-AL indicator), and the other DSEs may configure information bits by bits continued from the first DSE. Alternatively, the four DSEs may correspond to the same DSEs. The DS-AL may be indicated through CRC rather than a particular indicator. For example, as in Table 1 below, a CRC mask may indicate the DS-AL. In this example, it is presumed that a CRC bit size is 16. However, it is clear that the present invention may be applied in a case of CRC of larger or smaller bits.

TABLE 1

| Discovery signal aggregation level | Discovery signal CRC mask $<X_{ant,0}, X_{ant,1}, \ldots, X_{ant,15}>$ |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |
| 8 | <1, 1, 1, 1, 0, 0, 0, 0, 1, 1, 1, 1, 0, 0, 0, 0> |

Figure 14:
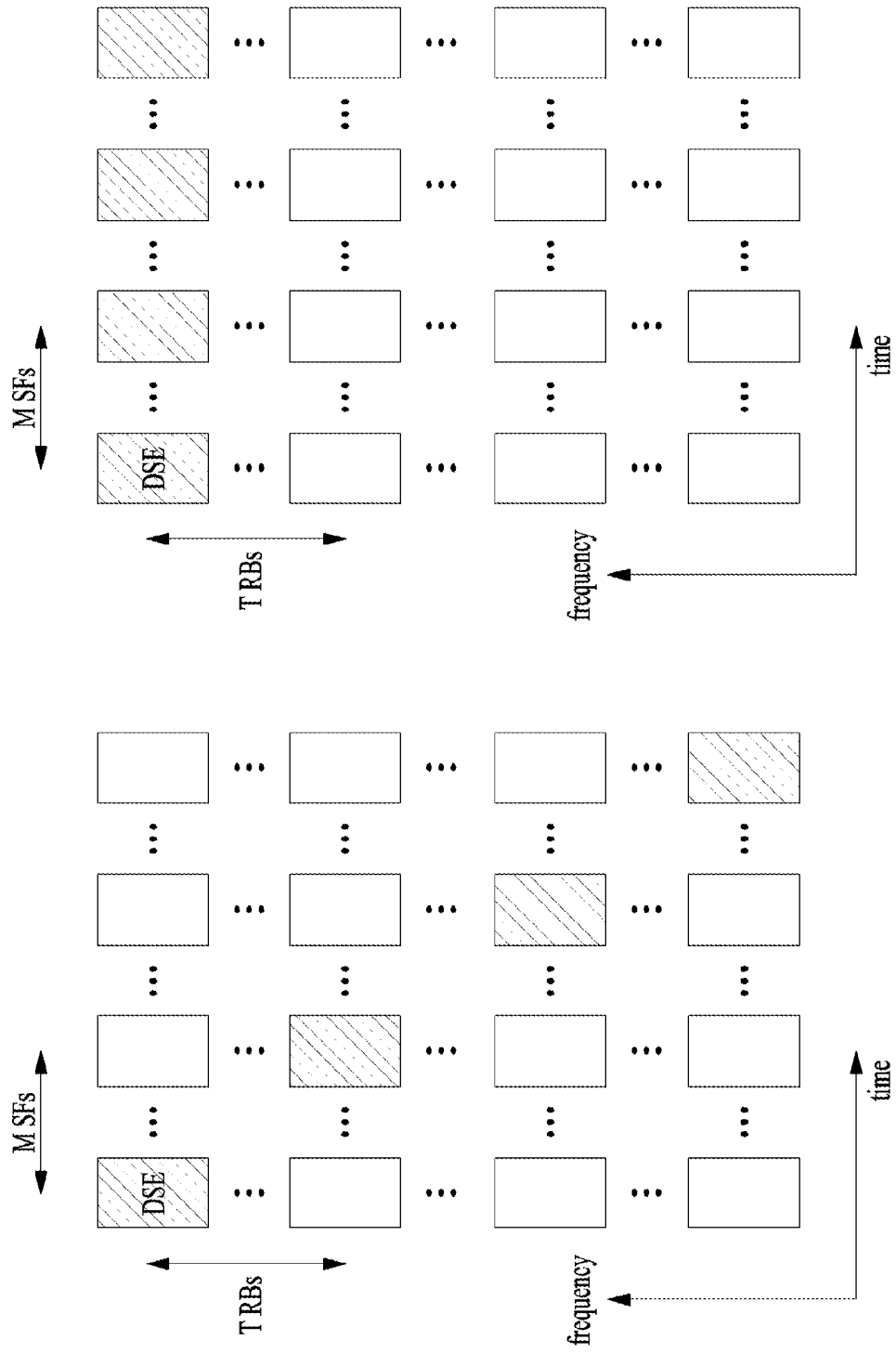

FIG. 14 illustrates an example of a DS in a case of DS-AL 4. Here, DSEs may correspond to one PRB pair. Specifically, referring to FIG. 14(a), the respective DSEs may be separated from each other by M subframes in the time domain and T RBs in the frequency domain. In this case, the values of M and T may be predetermined or included together with information indicating a DS-AL. FIG. 14(b) illustrates a case in which DSEs are selected from the same frequency domain.

When a DS-AL is high, a DS transmission probability may decrease. However, a case in which a particular UE needs to be discovered within a short period of time may be excluded. In addition, when UEs form a cluster in a particular region, a DS of a cluster header UE may have a high DS-AL and transmission possibility.

Configuration of DS

Hereinafter, a description will be given of a specific configuration of a DS including a transmission period and a guard period of a signal (first signal) for automatic gain control (AGC) (or Tx/Rx switching) based on the above descriptions of the DSE, the DS configuration, and the DS-AL. In the description below, it is presumed that DSEs are configured as one PRB pair. However, the present invention is not limited thereto. As described above, the DSEs may be configured as a part of one PRB pair or two or more PRB pairs.

Figure 15:
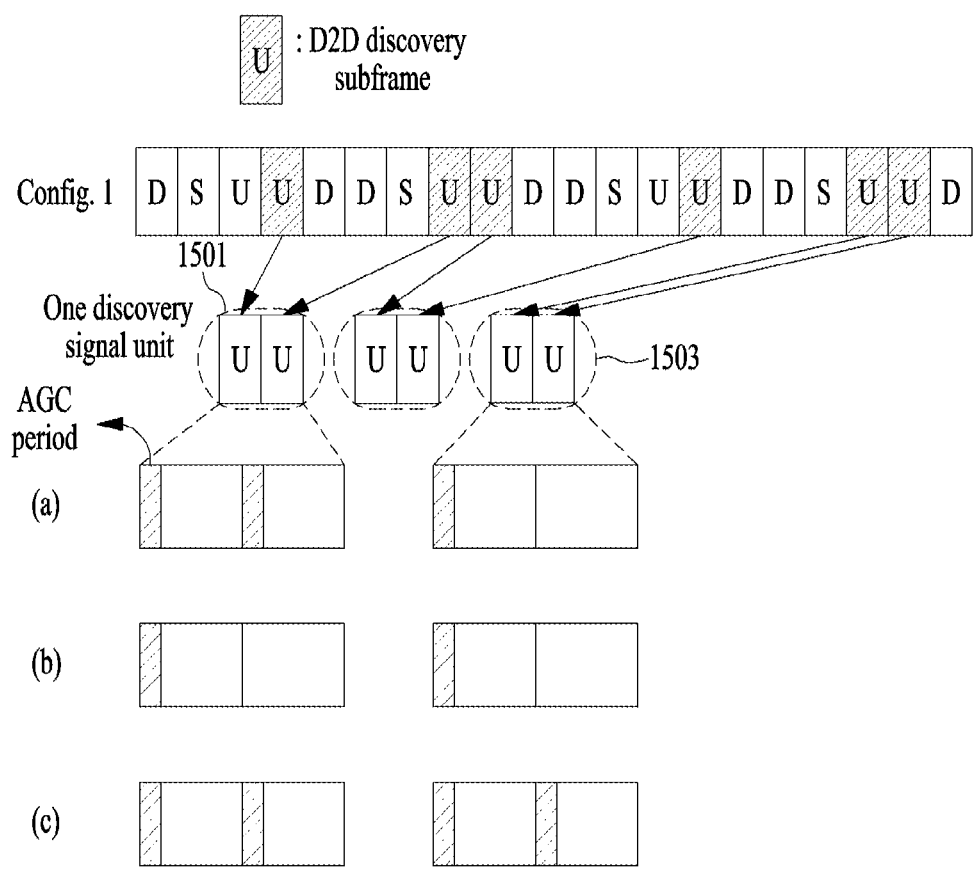

A DS may include a signal transmission resource region for AGC. When a DS-AL is 1, a first PRB pair included in the DS may include a resource region for AGC. Whether an n-th PRB pair (n>=2) includes a resource region for AGC may be determined based on whether a subframe subsequent to a subframe including an (n−1)th PRB pair is for uplink transmission or downlink transmission. Here, when the subframe subsequent to the subframe including the (n−1)th PRB pair is for downlink transmission, the n-th PRB pair may include the resource region for AGC. In other words, the first PRB pair included in the DS includes the resource region for AGC, and whether a second or subsequent PRB pair includes a resource region for AGC may be determined based on whether the second or subsequent PRB pair is continued from a previous PRB pair. The resource region for AGC may not be included when the second or subsequent PRB pair is continued from the previous PRB pair, and the resource region for AGC may be included when the second or subsequent PRB pair is not continued from the previous PRB pair. FIG. 15 illustrates an example of the above-described case, and the DS-AL is presumed to be 2. Referring to FIG. 15(a), it can be understood that, when a subframe subsequent to a subframe including a first PRB pair in a first DS 1501 is for downlink transmission, a second PRB pair (subframe including the second PRB pair) includes a resource region for AGC. In addition, it can be understood that, since a subframe subsequent to a subframe including a first PRB pair in a third DS 1503 is for uplink transmission, a second PRB pair does not include a resource region for AGC. As another example, as illustrated in FIG. 15(b), referring to PRB pairs included in a DS, only a first PRB pair may include a resource region for AGC. In this case, AGC may be measured in the first PRB pair and then stored in a memory, and the stored value may be used in a second or subsequent PRB pair. As another example, as illustrated in FIG. 15(c), every PRB pair included in a DS may include a resource region for AGC.

Figure 16:
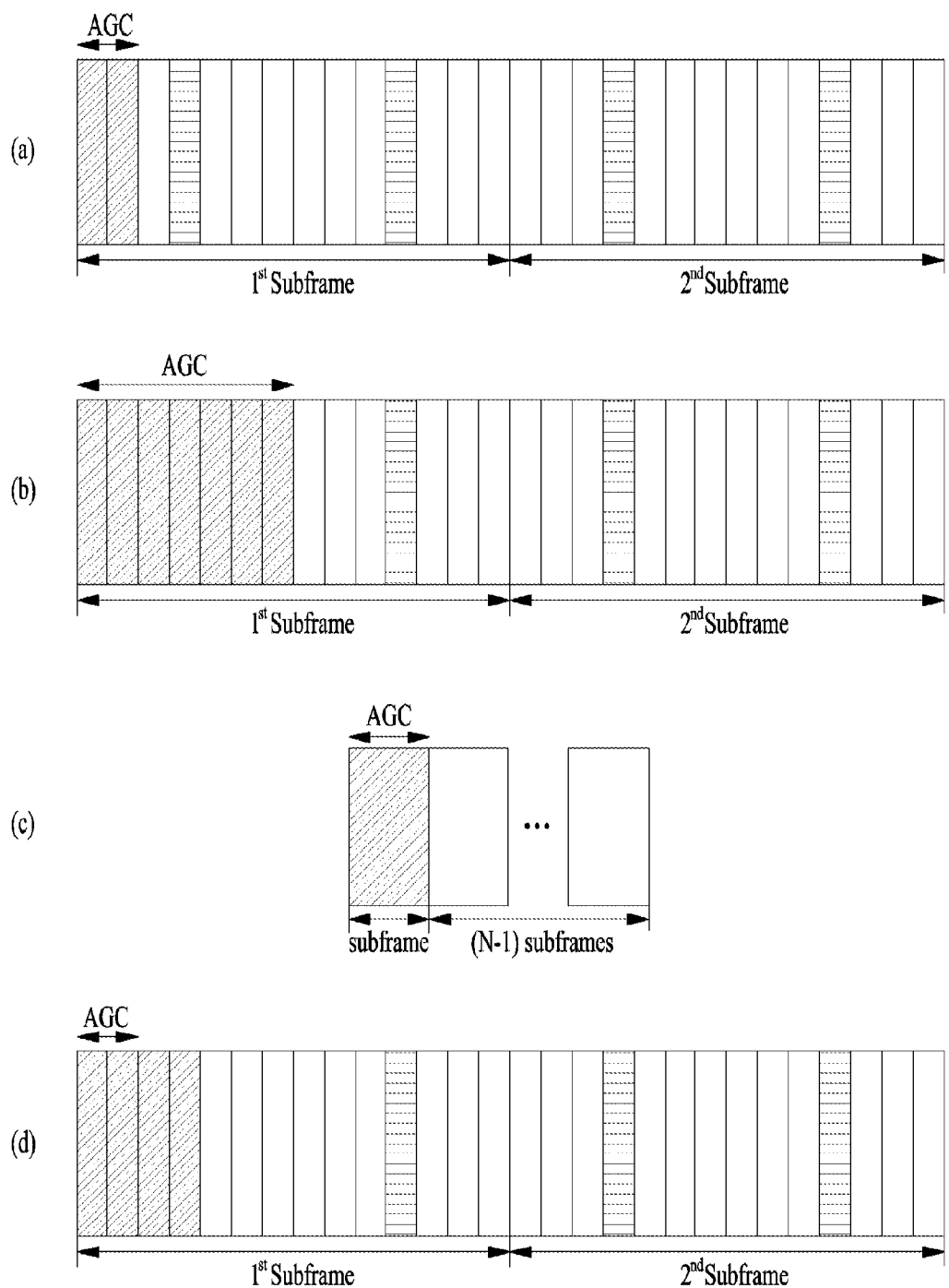

In the above description, a previously known sequence, etc. may be transmitted in a resource region for AGC. For example, a DMRS, a PSS/SSS, other RSs, or a combination/repetition of such a sequence may be transmitted. As another example, an AGC symbol may be generated in a form of IFDMA having a repetition factor of 2 or more. As illustrated in FIG. 16, the resource region for AGC may correspond to one or more symbols (FIG. 16(a), one slot (FIG. 16(b)), one subframe (FIG. 16(c)), or symbols up to a first DMRS (FIG. 16(d)). In the resource region for AGC, a particular sequence may be repeatedly transmitted on one symbol, or the same sequence may be repeated in every symbol. Alternatively, the above sequences may be respectively transmitted on every symbol. For example, a sequence repeated in the time domain such as an SRS may be transmitted on a first symbol, and a DMRS may be transmitted on a second symbol.

In addition, the DS may include a guard period in a last PRB pair included in the DS. More specifically, when a subframe subsequent to a subframe in which the DS is transmitted corresponds to a cellular uplink subframe, the guard period is required to avoid collision.

In TDD, when a subframe subsequent to a subframe including a last PRB pair among PRB pairs included in the DS is for uplink transmission (FIG. 17(a)), a length of a guard period thereof may be linked to a maximum timing advance value in a cell to which a UE belongs. When the subframe subsequent to the subframe including the last PRB pair among PRB pairs included in the DS is for downlink transmission (FIG. 17(b)), the length of the guard period may be related to a time necessary for transmission-reception switching. When an offset of −20 us is applied during DS transmission, the length of the guard period may be 0. In this way, the length of the guard period may be differently set according to type of the subframe subsequent to the subframe including the last PRB pair among PRB pairs included in the DS.

Unlike the above example, the length of the guard period may be unchanged in TDD. Specifically, PRB pairs included in the DS may be included from a last subframe of contiguous uplink subframes at all times. In other words, the DS is configured such that a last subframe of subframes including the respective PRB pairs included in the DS is the same as the last subframe of contiguous uplink subframes. For example, the DS is configured as indicated by an arrow of FIG. 18. In this case, a subframe subsequent to the last subframe of subframes included in the DS is a downlink subframe at all times, and thus only a time necessary for transmission-reception switching may be used in a guard period.

FIG. 19 illustrates a guard period in a case of FDD. As illustrated in FIG. 19, in FDD, a last PRB pair (a subframe including the last PRB pair) among PRB pairs included in a DS may have a length of a guard period related to a maximum timing advance value in a cell.

In the above description, the length of the guard period may correspond to 1) a preset value, ii) an RRC-signaled value, iii) a value indicated by a physical layer or MAC layer signal by signaling N candidates through RRC signaling, or iv) a value indicated by a physical layer signal (for example, in a DCI format, etc.). In addition, the length of the guard period may vary according to a type of subsequent subframe among the above values. For example, the value of i) may be used when the subsequent subframe is an uplink subframe, and the value of ii) may be used when the subsequent subframe is a downlink subframe.

As described in the foregoing, mapping of a data RE in a period/guard period for AGC may correspond to i) rate matching excluding the period/guard period for AGC, ii) puncturing after data mapping irrespective of the period/guard period for AGC, and iii) a scheme in which the period for AGC cannot be included in a data mapping subframe when the period for AGC is one subframe. RE mapping schemes in the period/guard period for AGC may be combined and configured. For example, when an AGC period is present in every subframe, the AGC period may be subjected to rate matching, and a guard period may be punctured to maintain a characteristic common to another D2D subframe.

The number of PRB pairs for the DS may increase due to the period/guard period for AGC. More specifically, when the number of REs available for data mapping becomes less than or equal to a particular threshold value due to AGC or the guard period, one discovery signal may be defined using more REs when compared to a case in which the number of available REs is greater than or equal to the particular threshold value. For example, the number of PRB pairs for one discovery signal may increase when an extended CP is used rather than a normal CP.

Meanwhile, when the DS includes a plurality of PRB pairs in the time or frequency domain, particular information may be included in the PRB pairs and transmitted based on a relation to a DMRS. In this instance, the relation to the DMRS may be used to transmit CS of the DMRS in a predetermined pattern, indicate particular information to a particular OCC by applying an OCC to the DMRS, or indicate particular information or a relation between base sequences using different base sequences in different PRBs. For example, when one DS includes 2 PRB pairs in the frequency domain, a length of the DMRS may correspond to 1 RB, and the relation may be used to indicate particular information using a particular pattern between DMRSs for each PRB pair. This may be similarly applied when a plurality subframes are included in one DS in the time domain. In this instance, information that can be indicated using a DMRS pattern may correspond to some or all of information about whether it is inside/outside coverage, NDI (information about whether transmission is performed using the same message within a certain period of time), timing related to a synchronization source, a type of synchronization source (information about whether it is a UE or a base station, or a position of a hop corresponding to the synchronization source), etc.

Referring to the above-described discovery signal, when one discovery signal is transmitted through a plurality of subframes, subframe hopping may be applied. Here, hopping is applied in transmission time interval (TTI) bundling. When a particular RB is selected through energy sensing, random selection, etc., and one discovery signal is transmitted through M subframes, a frequency resource may be allocated by a hopping pattern determined in the M subframes based on the selected RB. Alternatively, it is possible to use PUSCH hopping defined in the legacy LTE/LTE-A system. For example, Type 1 PUSCH hopping may be applied. In this instance, when a transmission region of the discovery signal does not correspond to a continuous frequency domain, an RB may be reindexed in the frequency domain such that an index of a resource subjected to frequency hopping may be set. In addition, it is possible to use a parameter indicating an RB size of a discovery signal transmission region instead of a parameter such as $N_{RB}^{PUSCH}$ in existing Type 1 PUSCH hopping (in this instance, the size of the discovery signal transmission region may be indicated to a UE by an upper layer signal). When Type 2 PUSCH hopping is applied, a subband size may be set depending on the number of subframes through which one discovery signal is transmitted in the time domain. For example, when one discovery signal is transmitted through four subframes, the subband size may be set to 4 (that is, an aggregation level of the discovery signal). Information about whether mirroring is performed, a hopping seed value, etc. may be delivered by upper layer signaling.

Figure 20:
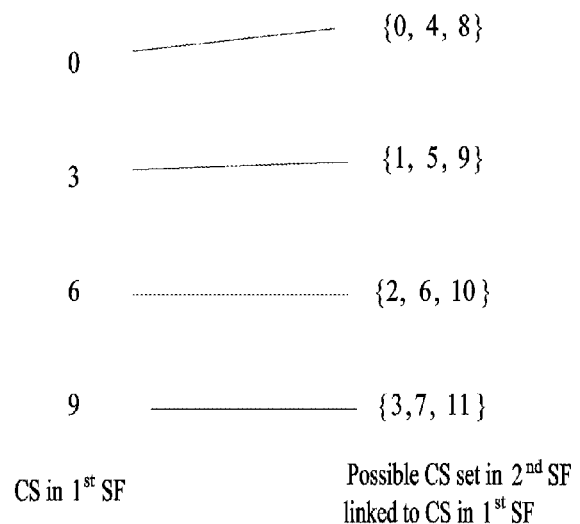

Meanwhile, since respective UEs transmit RSs when a discovery signal is transmitted, the UEs may use the same RS (for example, DMRS). In particular, when the RSs are transmitted in the same resource region, RS collision may be a big problem. Therefore, a UE may solve the problem using CS of the DMRS. As a specific example, the same DMRS CS may be used in a subframe/slot in which one discovery signal is transmitted. Alternatively, different DMRS CSs may be used for each subframe/slot in which one discovery signal is transmitted. As a specific implementation example, DMRS CS may be randomly selected and used for each subframe/slot in a predetermined/signaled set of DMRS CSs. As another example, CS sets available in a subsequent subframe/slot may be restricted according to DMRS CS for each subframe/slot. Here, restriction of CS sets refers to restriction of available CS sets to some sets. In addition, a size of a CS set available in each subframe/slot may be restricted to a particular size. The particular size may be set in connection with a size of a resource region in which the discovery signal is transmitted. For example, (when the total number of blind decodings is constant irrespective of the size of the resource region), a set size of a blind decoding set may decrease as the resource region in which the discovery signal is transmitted increases. In addition, a size of a CS set may be set according to the number of subframes used for transmission of the discovery signal. For example, a set size of a CS set for each subframe may decrease as the number of subframes increases. As a specific example, when 0 is used as CS in a first subframe used for transmission of the discovery signal, a value corresponding to one of {0, 3, 6, 9} may be used as CS in a subsequent subframe. Alternatively, a CS set linkage relation between respective subframes used for transmission of the discovery signal may be predetermined. For example, as illustrated in FIG. 20, when CS values correspond to 0, 3, 6, and 9 in a first subframe, it is possible to use respective CS sets of {0, 4, 8}, {1, 5, 9}, {2, 6, 10}, and {3, 7, 11}.

The AGC period insertion scheme and the RE mapping scheme described above are not restricted to discovery, and may be used for D2D communication after discovery.

Configuration of Device According to Embodiment of the Invention

Figure 21:
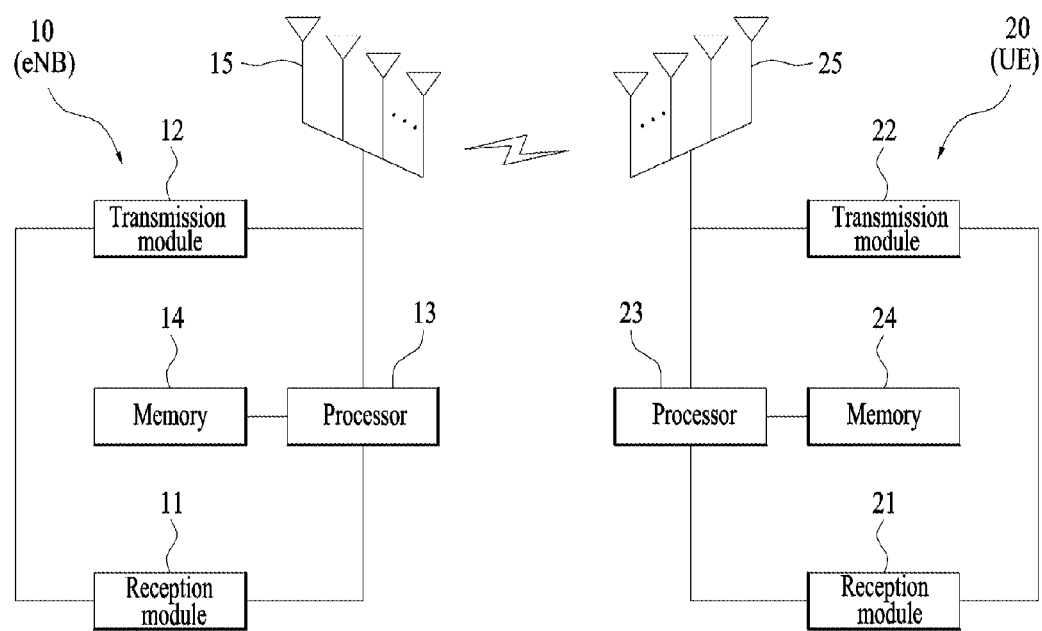
FIG. 21 is a diagram illustrating a configuration of a transceiver.

FIG. 21 illustrates configurations of a transmission point device 10 and a UE device 20 according to an embodiment of the present invention.

Referring to FIG. 21, the transmission point device 10 according to the present invention may include a reception module 11, a transmission module 12, a processor 13, a memory 14, and a plurality of antennas 15. The plurality of antennas 15 refer to a transmission point device that supports MIMO transmission and reception. The reception module 11 may receive various signals, data, and information on uplink from a UE. The transmission module 12 may transmit various signals, data, and information on downlink to the UE. The processor 13 may control overall operation of the transmission point device 10.

The processor 13 of the transmission point device 10 according to the present embodiment may process requirements in the respective embodiments described above.

In addition, the processor 13 of the transmission point device 10 performs operation processing of information received by the transmission point device 10, information to be transmitted to the outside, etc. The memory 14 may store operation-processed information, etc. for a certain period of time. In addition, the memory 14 may be replaced by a component such as a buffer (not illustrated), etc.

Subsequently, referring to FIG. 21, the UE device 20 according to the present invention may include a reception module 21, a transmission module 22, a processor 23, a memory 24, and a plurality of antennas 25. The plurality of antennas 25 refer to a UE device that supports MIMO transmission and reception. The reception module 21 may receive various signals, data, and information on downlink from a base station. The transmission module 22 may transmit various signals, data, and information on uplink to the base station. The processor 23 may control overall operation of the UE device 20.

The processor 23 of the UE device 20 according to the present embodiment may process requirements in the respective embodiments described above.

In addition, the processor 23 of the UE device 20 performs operation processing of information received by the UE device 20, information to be transmitted to the outside, etc. The memory 24 may store operation-processed information, etc. for a certain period of time. In addition, the memory 24 may be replaced by a component such as a buffer (not illustrated), etc.

Specific configurations of the transmission point device 10 and the UE device 20 may be implemented such that the above descriptions in various embodiments of the present invention are independently applied or two or more embodiments are simultaneously applied. Repeated description is omitted for clarity.

In addition, in the description with reference to FIG. 21, the description of the transmission point device 10 may be similarly applied to a repeater as a downlink transmission entity or an uplink reception entity, and the description of the UE device 20 may be similarly applied to a repeater as a downlink reception entity or an uplink transmission entity.

The above-described embodiments of the present invention may be implemented through various means. For example, the embodiments of the present invention may be implemented by hardware, firmware, software, or a combination thereof.

In hardware implementation, a scheme according to embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In firmware or software implementation, a scheme according to embodiments of the present invention may be implemented in the form of a module, a procedure, a function, etc. performing a function or an operation described above. Software code may be stored in a memory unit and executed by a processor. The memory unit may be located inside of the processor or outside thereof to transmit and receive data to and from the processor via various known means.

Detailed description of the preferred embodiments of the present invention disclosed as above is provided so that those skilled in the art may implement and carry out the present invention. Although description has been made by referring to the preferred embodiments of the present invention, it is understood that those skilled in the art may variously correct and modify the present invention within the scope of the present invention. For example, those skilled in the art may use the configurations described in the above-described embodiments by combining the configurations. Therefore, the present invention is not limited to the embodiments mentioned above, and is intended to include the widest scope matching the principles and new characteristics disclosed herein.

The present invention may be embodied in other specific forms without departing from the spirit and characteristics of the present invention. Thus, the descriptions are to be considered in all respects as illustrative and not restrictive. The scope of the present invention should be determined by reasonable interpretation of the appended claims and all change which comes within the equivalent scope of the invention are within the scope of the invention. The present invention is not limited to the embodiments mentioned above, and is intended to include the widest scope matching the principles and new characteristics disclosed herein. In addition, some claims not explicitly referring to one another in the claims may be combined to constitute an embodiment or to be included as a new claim by means of amendment after the application is filed.

INDUSTRIAL APPLICABILITY

The embodiments of the present invention described above are applicable to various mobile communication systems.

The invention claimed is:

1. A method of transmitting a discovery signal related to device-to-device (D2D) communication by a first user equipment (UE) in a wireless communication system, the method comprising:
    mapping a codeword related to the discovery signal to at least two physical resource block (PRB) pairs on a time axis; and
    transmitting the mapped codeword related to the discovery signal,
    wherein a first PRB pair among the at least two PRB pairs includes a resource region for transmitting a specific signal,
    wherein, whether the resource region for transmitting the specific signal is included in an n-th PRB pair (n>=2) among the at least two PRB pairs is determined based on whether a subframe subsequent to a subframe including an (n−1)th PRB pair is for uplink transmission,
    wherein each of the pairs of PRBs corresponds to a discovery signal element, and the number of the at least two PRB pairs corresponds to a discovery signal aggregation level, and
    wherein the discovery signal aggregation level is greater than or equal to a predetermined value when the UE is related to public safety.

2. The method according to claim 1, wherein a subframe including a last PRB pair of the at least two PRB pairs includes a guard period.

3. The method according to claim 2, wherein subframes including the at least two PRB pairs, respectively, are continuous uplink subframes.

4. The method according to claim 3, wherein a last subframe of the subframes including the at least two PRB pairs, respectively, is a last subframe of the continuous uplink subframes.

5. The method according to claim 3, wherein a length of the guard period is related to a time necessary for transmission-reception switching.

6. The method according to claim 2, wherein a length of the guard period is related to a maximum timing advance in a cell including the first UE when a subframe subsequent to the subframe including the last PRB pair among the at least two PRB pairs is for uplink transmission.

7. The method according to claim 2, wherein a length of the guard period is related to a time necessary for transmission-reception switching when a subframe subsequent to the subframe including the last PRB pair among the at least two PRB pairs is for downlink transmission.

8. The method according to claim 2, wherein a length of the guard period is 0 when an offset of −20 us is applied to transmission of the discovery signal.

9. The method according to claim 1, wherein the n-th PRB pair includes the resource region for transmitting the specific signal when the subframe subsequent to the subframe including the (n-1)th PRB pair is for downlink transmission.

10. The method according to claim 1, wherein the mapping of the codeword is performed using a time-first scheme in an ascending order of subcarrier indices in the at least two PRB pairs.

11. The method according to claim 1, wherein the discovery signal aggregation level is indicated by a header included in the discovery signal element.

12. The method according to claim 1, wherein the specific signal is used for automatic gain control (AGC) of a second UE receiving the discovery signal.

13. A first UE transmitting a discovery signal related to D2D communication in a wireless communication system, comprising:
  a receiver; and
  a processor,
  wherein the processor maps a codeword related to the discovery signal to at least two PRB pairs on a time axis, and transmits the mapped codeword,
  a first PRB pair among the at least two PRB pairs includes a resource region for transmitting a specific signal,
  wherein whether the resource region for transmitting the specific signal is included in an n-th PRB pair (n>=2) among the at least two PRB pairs is determined based on whether a subframe subsequent to a subframe including an (n−1)th PRB pair is for uplink transmission,
  wherein each of the pairs of PRBs corresponds to a discovery signal element, and the number of the at least two PRB pairs corresponds to a discovery signal aggregation level, and
  wherein the discovery signal aggregation level is greater than or equal to a predetermined value when the UE is related to public safety.

* * * * *